W. C. FRICK.
APPARATUS FOR WELDING TUBING.
APPLICATION FILED JULY 19, 1909. RENEWED JAN. 5, 1914.
1,105,765.
Patented Aug. 4, 1914.
2 SHEETS—SHEET 1.
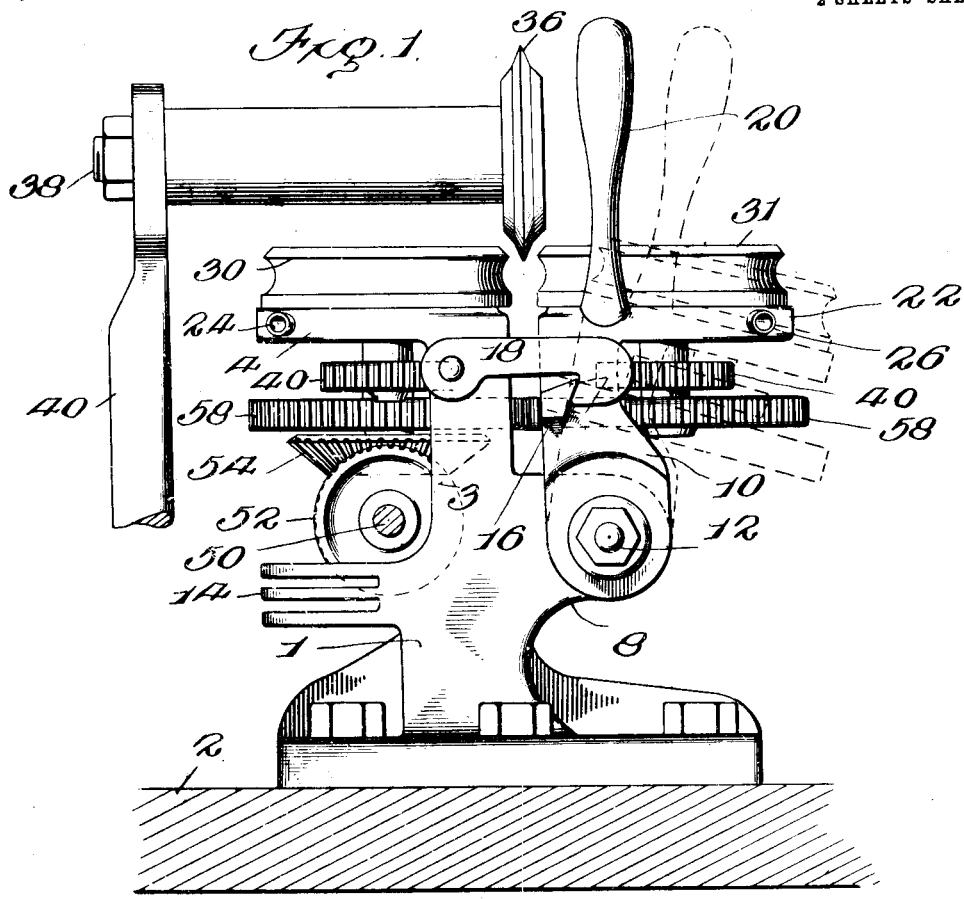
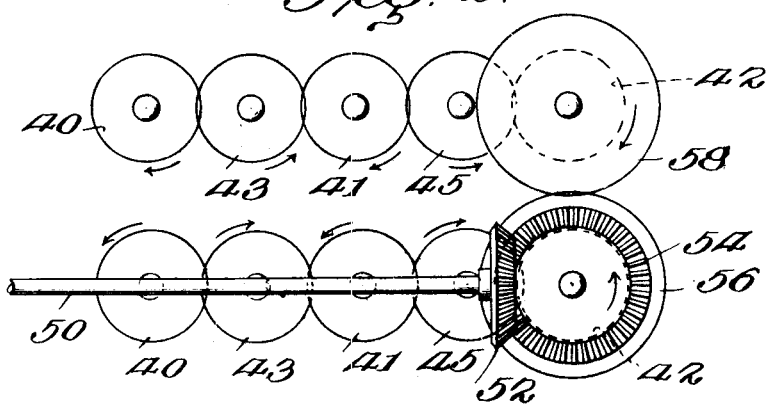

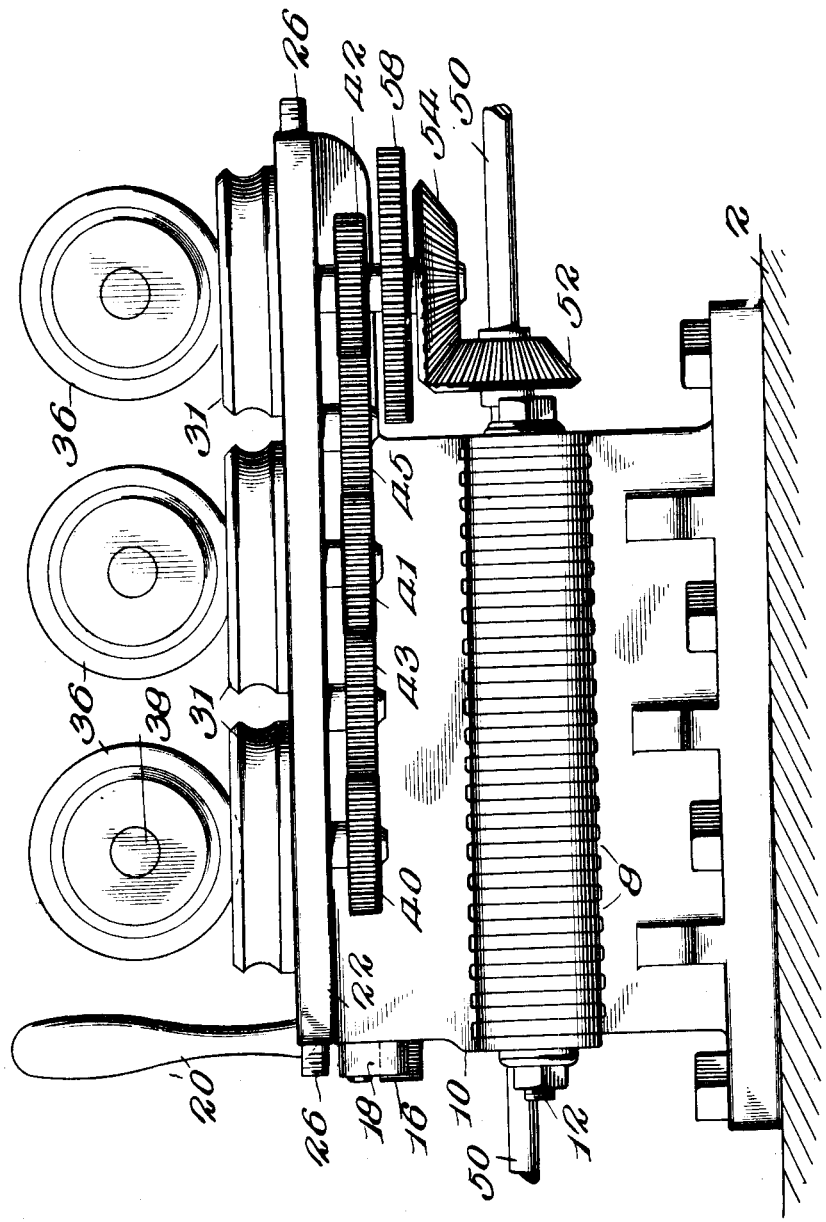

UNITED STATES PATENT OFFICE.

WILLIAM C. FRICK, OF DEAL BEACH, NEW JERSEY.

APPARATUS FOR WELDING TUBING.

1,105,765.     Specification of Letters Patent.     Patented Aug. 4, 1914.

Application filed July 19, 1909, Serial No. 508,446. Renewed January 5, 1914. Serial No. 810,512.

*To all whom it may concern:*

Be it known that I, WILLIAM C. FRICK, a citizen of the United States, residing at Deal Beach, in the county of Monmouth and State of New Jersey, have invented certain new and useful Improvements in Apparatus for Welding Tubing, of which the following is a specification.

This invention relates to improvements in novel apparatus for use in electrically welding pipe and the object of the invention is to provide mechanism which will make it possible to positively feed the material through rollers while the material is being heated to welding heat and also to provide means whereby part of the mechanism may be shifted to make the work operated upon accessible.

In the preferable embodiment of my invention I employ a fixed table which is preferably water cooled and carries a series of positively driven forming rolls, coacting with which is a movable frame carrying a table (also water cooled) and positively driven rolls which coact with the rollers upon the fixed frame. This preferable embodiment is shown in the accompanying drawings and will now be described.

In the drawings accompanying and forming part hereof, Figure 1 is an end elevation of mechanism constructed in accordance with my invention. Fig. 2 is a view of the gearing used in Fig. 1. Fig. 3 is a side elevation looking from the right as shown in Fig. 1.

Referring now to the details of the drawings by numerals; 1 designates the main frame which is suitably connected to a bed or table 2 and which is provided with standards 3 which support a table 4. The standards 3 also are provided with lugs 8 at one side which form parts of a hinge; the other part of the hinge being formed upon a movable frame 10 pivotally connected to the lugs 8 by means of a bolt 12, the construction being such that the movable frame 10 may be moved on the pivot 12 and at the same time the hinge is so constructed as to form a good electrical connection between the movable frame 10 and the main frame 1. In order to supply current to the main frame 1 and its connected parts said frame is provided with the usual bus-bars 14 shown at the left hand side of Fig. 1. The movable frame 10 is provided with a lug 16 with which coacts a pivoted latch 18 supported by one of the standards 3 as clearly seen in Fig. 1. The construction is such that when the pivoted latch 18 engages the lug 16 as shown in full lines in said Fig. 1, the movable frame 10 is held in operative position with respect to the main frame 1, and when it is desired to shift the movable frame 10, for the purpose of getting at the pipe being operated upon, all that it is necessary to do is to move the latch 18 when the operator may by engaging the handle 20, shift the movable frame from the position shown in full lines in Fig. 1 to the position shown in dotted line in the same figure, or farther if it is necessary to do so. The movable frame 10 also carries a table 22 coresponding to the aforesaid table 4 which is carried by the main frame 1 and each of these tables is provided with connections 24 and 26 for supplying water for the purpose of preventing the tables from becoming too highly heated when in use. Each of the tables 4 and 22 is provided with a series of electrically-connected grooved rollers 30 and 31 and coacting with these series is a set of vertical rollers 36 arranged in the position shown in Figs. 1 and 3 and which are each supported upon a shaft 38 supported by an arm 40 as shown in Fig. 1. In the operation of my device the electric current passes from the roller 36 through the pipe being operated upon to the rollers 30 and 31 but inasmuch as I am not claiming as part of my invention the means of supplying current to these rollers it is unnecessary to further describe this feature.

Underneath each of the tables 4 and 22 are a series of gears 40, 41 and 42, these gears being connected with the rollers 30 and 31 so as to positively drive the same. Between the gears 40, 41 and 42 are idler gears 43 and 45. In order to drive these gears to positively rotate the rollers 30 and 31, I employ a main or drive shaft 50 and this shaft has connected to it a bevel gear 52 which meshes with and drives a similar gear 54 secured to the same shaft to which one of the gears 42 is connected. The shaft 50 and the bevel gears 52 and 54 are carried by the main frame 1 and therefore are not movable other than being rotatable. Secured to the same shaft which carries the bevel gear 54 is a gear 56 which meshes with a similar gear 58 on the shaft which carries the companion gear 42 on the movable frame 10. This construction makes it possible when the parts are as shown in full lines in Fig. 1 for the main shaft 50 to drive all of the gears shown in Fig. 2. When thus driven, the metal forming the tubing, is positively fed through the rollers 30 and 31 and during this feeding, the electric current is supplied through the rollers 36 so as to weld the pipe in its passage through the aforesaid rollers 30 and 31. It frequently becomes necessary to give some attention to the material in its passage through the rollers and for this purpose I have provided the movable frame 10 carrying the gears and rollers 31 so that this entire half of the apparatus may be thrown to the position shown in dotted lines in Fig. 1 in order that proper attention may be given to the material when necessary.

From the foregoing and accompanying drawings it will be seen that I have provided mechanism for holding the tube in its passage through the welding apparatus which comprises two tables, preferably water jacketed, one fixed and the other movable, each of which carries a series of rollers and gears for operating the same. It will also be seen that by simply releasing the latch 18 and moving the handle 1 the movable frame 10, its table 22 and all of its gears and rollers may be moved away from the fixed table 1 and its connected gears and rollers. In operation a number of these tables is used, but as they are usually identical, only one of them is shown in the drawings. I have referred to the fact that electric current may be used for the welding, which current may pass from the roller 36, through the metal being treated, to the rollers 30 and 31, but since my present invention does not reside in the manner in which the current is caused to pass, I do not limit my claims to the particular manner in which the welding current is employed.

What I claim as my invention is:

1. In welding apparatus, a suitable support carrying two series of grooved rollers, and means for positively driving said rollers said rollers being electrically connected, substantially as described.

2. In welding apparatus, a frame carrying a series of rollers in combination with a second frame carrying a series of rollers co-acting with the first series of rollers, one of said frames being movable with respect to the other and said rollers being electrically connected.

3. In welding apparatus, a frame carrying a series of electrically connected rollers in combination with a second frame carrying a series of electrically connected rollers co-acting with the first series of rollers, one of said frames being movable with respect to the other, and each of said frames being water cooled, substantially as described.

4. In welding apparatus, a frame carrying a series of rollers in combination with a second frame carrying a series of rollers co-acting with the first series of rollers, one of said frames being movable with respect to the other, each of said frames being provided with means for positively driving the rollers, substantially as described.

5. In welding apparatus, a frame carrying a series of rollers in combination with a second frame carrying a series of rollers co-acting with the first series of rollers, one of said frames being movable with respect to the other, each of said frames being water cooled and provided with means for positively driving the rollers, substantially as described.

6. In welding apparatus, a frame carrying a table, a series of rollers supported by said table, a series of gears also carried by the table for driving said rollers in combination with a second frame movable with relation to the first frame and carrying a table, a series of rollers supported by said table and a series of gears for driving said rollers, substantially as described.

7. In welding apparatus, a frame carrying a table, a series of electrically connected rollers supported by said table, a series of gears also carried by the table for driving said rollers in combination with a second frame movable with relation to the first frame and carrying a table, a series of rollers supported by said table and a series of gears for driving said rollers, the second frame being pivoted to the first frame whereby the rollers and gears on one frame may be moved away from the rollers and gears of the other frame, substantially as described.

8. In welding apparatus, a frame carrying a series of electrically connected rollers in combination with a second frame carrying a set of rollers co-acting with the first set of rollers, one of said frames being movable with respect to the other, each of said frames being provided with means for positively driving the rollers, and a latch for locking said frames in their operative position, substantially as described.

9. In welding apparatus, a frame carrying a table, a series of electrically connected rollers carried by said table, a series of gears also carried by the table for driving said rollers, in combination with a second frame movable with relation to the first frame and carrying a table, and a series of rollers carried by said table and provided with gears for driving the same, the gears on the second table being movable to and from the gearing on the first table whereby one set of rollers is driven from the other, substantially as described.

Signed by me at Asbury Park, New Jersey, this 30th day of June, 1909.

WILLIAM C. FRICK.

Witnesses:
BERTHA G. STRYKER,
ANNA F. WHITLOCK.